(12) United States Patent
Lu et al.

(10) Patent No.: US 9,406,919 B2
(45) Date of Patent: Aug. 2, 2016

(54) METAL CYANOMETALLATE ELECTRODE WITH SHIELD STRUCTURE

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 200 days.

(21) Appl. No.: 14/193,501

(22) Filed: Feb. 28, 2014

(65) Prior Publication Data

US 2014/0176077 A1    Jun. 26, 2014

Related U.S. Application Data

(63) Continuation-in-part of application No. 14/174,171, filed on Feb. 6, 2014, which is a continuation-in-part of application No. 14/067,038, filed on Oct. 30, 2013, which is a continuation-in-part of application No.

(Continued)

(51) Int. Cl.
  *H01M 4/62* (2006.01)
  *H01M 2/16* (2006.01)
  (Continued)

(52) U.S. Cl.
  CPC ............ *H01M 2/1686* (2013.01); *C01B 17/02* (2013.01); *C01B 19/02* (2013.01); *C01B 25/003* (2013.01);
  (Continued)

(58) Field of Classification Search
  CPC ..... H01M 4/136; H01M 4/58; H01M 10/054; H01M 4/133; H01M 4/1345; H01M 4/04; H01M 4/381; Y02E 60/122; Y02E 60/50; C01B 31/00; C01B 31/04; C01B 31/30; C01D 1/02
  USPC ....................................... 429/211; 252/519.14
  See application file for complete search history.

(56) References Cited

U.S. PATENT DOCUMENTS

2012/0328936 A1*  12/2012  Wessells ............. H01M 10/054
                                                                429/188
2014/0127560 A1*   5/2014  Wessells ................ C25D 17/10
                                                                429/188

OTHER PUBLICATIONS

V. D. Neff, "Some Performance Characteristics of a Prussian Blue Battery", Journal of Electrochemical Society 1985, 132, 1382-1384.
(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A mechanism is presented for shielding a cathode in a metal cyanometallate battery. A battery is provided with an anode, a cathode, an electrolyte, and an ion-permeable membrane separating the anode from the cathode. The cathode is made up of a plurality of metal cyanometallate layers overlying the current collector. At least one of the metal cyanometallate layers is an active layer formed from an active material $A_X M1_Y M2_Z(CN)_N \cdot mH_2O$, where "A" is an alkali metal, alkaline earth metal, or combination thereof. At least one of the metal cyanometallate layers is a shield layer comprising less than 50 percent by weight (wt %) active material. In response to applying an external voltage potential between the cathode and the anode, the method charges the battery. Upon discharge, the shield layer blocks metal particles from contacting active layers. Simultaneously, the shield layer transports metal ions from the electrolyte to the active layers.

21 Claims, 7 Drawing Sheets

Related U.S. Application Data

14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | |
|---|---|
| *H01M 4/58* | (2010.01) |
| *C01C 3/12* | (2006.01) |
| *H01M 4/136* | (2010.01) |
| *H01M 4/04* | (2006.01) |
| *H02J 7/00* | (2006.01) |
| *H01M 4/134* | (2010.01) |
| *H01M 4/1395* | (2010.01) |
| *C01B 17/02* | (2006.01) |
| *C01B 19/02* | (2006.01) |
| *C01B 25/00* | (2006.01) |
| *C01B 31/00* | (2006.01) |
| *C01B 33/021* | (2006.01) |
| *C01D 1/02* | (2006.01) |
| *C01D 15/02* | (2006.01) |
| *H01M 4/131* | (2010.01) |
| *H01M 4/133* | (2010.01) |
| *H01M 4/1391* | (2010.01) |
| *H01M 4/38* | (2006.01) |
| *H01M 4/485* | (2010.01) |
| *H01M 4/505* | (2010.01) |
| *H01M 4/56* | (2006.01) |
| *H01M 4/587* | (2010.01) |
| *H01M 10/054* | (2010.01) |
| *H01M 10/0525* | (2010.01) |
| *H01M 10/0565* | (2010.01) |
| *H01M 4/1397* | (2010.01) |
| *H01M 10/052* | (2010.01) |

(52) U.S. Cl.
CPC ............ *C01B 31/00* (2013.01); *C01B 33/021* (2013.01); *C01C 3/12* (2013.01); *C01D 1/02* (2013.01); *C01D 15/02* (2013.01); *H01M 2/1653* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

OTHER PUBLICATIONS

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue: a New Framework for Sodium Batteries", Chemistry Communications 2012, 48, 6544-6548.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Powers", Nature Communications 2011, 2, Article No. 550.

C. D. Wessells et al., "Nickel Hexacyenoferrate Nanoparticle Electrodes for Aqueous Sodium and Potassium Ion Batteries", Nano Letters 2011, 11, 5421-5425.

C. D. Wessells et al., "The Effect of Insertion Species on Nanostructured Open Framework . . . .", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

M. Hu and J. S. Jiang, "Facile Synthesis of Air-Stable Prussian White Microcubes via a Hydrothermal Method", Materials Research Bulletin 2011, 45, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

\* cited by examiner

Fig. 3B

ELECTRODE 300

METAL CYANOMETALLATE LAYERS 304

306-n

CURRENT COLLECTOR 302

ACTIVE LAYER 306-0

308 SHIELD LAYER

Fig. 3A

ELECTRODE 300

METAL CYANOMETALLATE LAYERS 304

CURRENT COLLECTOR 302

ACTIVE LAYER 306

308 SHIELD LAYER

METAL CYANOMETALLATE ELECTRODE WITH SHIELD STRUCTURE

RELATED APPLICATIONS

This application is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

which is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention

BACKGROUND OF THE INVENTION

1. Field of the Invention

This invention generally relates to electrochemical cells and, more particularly, to a cyanometallate battery with a cathode shielding layer.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^{30}$-ions can "rock" back and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode. In the meantime, electrons pass through an external circuit from the negative electrode to the positive electrode and generate electric power. During a charge, ions and electrons move along the reverse direction and go back to their original places.

Although LIBs have been successfully used, the conflict between lithium demand and its scarcity surges its cost, which hinders the further application of lithium-ion batteries on a large scale. Therefore, a low-cost rechargeable battery is urgently needed as an alternative to expensive LIBs. Under the circumstance, sodium-ion batteries are attracting attention because sodium has very similar properties to lithium, but a cheaper cost. Like lithium-ion batteries, sodium-ion batteries need $Na^+$-host materials as their electrode. Much effort has been expended to directly duplicate the $Li^+$-host structures, using $Na^+$-host electrode materials for the sodium-ion batteries. For example, $NaCoO_2$, $NaMnO_2$, $NaCrO_2$ and $Na_{0.85}Li_{0.17}Ni_{0.21}Mn_{0.64}O_2$, all having a layered-structure similar to $LiCoO_2$, have been developed for sodium-ion batteries. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$ and $Na_{1.5}VOPO_4F_{0.5}$, have also used as the positive electrode in sodium batteries.

However, it is impractical to copy the structures of $Li^+$-host compounds for $Na^+$ or $K^+$-host compounds. Sodium and potassium ions are much larger than lithium ions, and severely distort the structure of the $Li^+$-host compounds. Thus, it is very important for the advancement of sodium/potassium-ion batteries to develop new $Na^+/K^{30}$-host materials with large interstitial spaces in which sodium/potassium-ions can easily and reversibly move. $Na^+/K^+$-ions have been observed to intercalate into metal cyanide compounds.

Transition metal hexacyanoferrates (TMHCFs) with large interstitial spaces have been investigated as cathode materials for rechargeable lithium-ion batteries [1, 2], sodium-ion batteries [3, 4], and potassium-ion batteries [5]. With an aqueous electrolyte containing the proper alkali-ions or ammonium-ions, copper and nickel hexacyanoferrates ((Cu,Ni)-HCFs) exhibited a very good cycling life so that 83% capacity was retained after 40,000 cycles at a charge/discharge current of 17C [6-8].

FIG. 1 is a diagram depicting the crystal structure of a transition metal hexacyanometallate (TMHCM) (prior art). TMHCMs can be expressed as $A_xM1_yM2_z(CN)_n \cdot M_2O$, where A can be selected from, but not limited to alkali and alkaline metals, and M1 and M2 are transition metals such as titanium (Ti), vanadium (V), chrome (Cr), manganese (Mn), iron (Fe), cobalt (Co), nickel (Ni), copper (Cu), zinc (Zn), calcium (Ca), magnesium (Mg), etc. M1 and M2 can be the same or a different metal. The ratio (X:N) of M1 and M2 varies, depending on the materials used. In addition, various amounts of water ($H_2O$) can occupy in interstitial or lattice positions of MHCMs.

However, these materials demonstrated low capacities and energy densities because (1) just one sodium-ion can be inserted/extracted into/from per Cu-HCF or Ni-HCF formula, and (2) these TMHCF electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

To correct for these shortcomings, manganese hexacyanoferrate (Mn-HCF) and iron hexacyanoferrate (Fe-HCF) were used as cathode materials in a non-aqueous electrolyte [9, 10]. Assembled with a sodium-metal anode, Mn-HCF and Fe-HCF electrodes cycled between 2.0 V and 4.2 V and delivered capacities of about 110 mAh/g.

FIG. 2 is a diagram depicting metal-HFC (MHCF) electrode degradation as a result of sodium dendrites (prior art). It has been observed that MHCF electrodes exhibit a rapid capacity degradation with cycling when used in rechargeable sodium-ion batteries with a sodium metal anode. Investigation of the degradation behavior of MHCF cathodes in sodium-ion batteries reveals that they are not stable in the electrolyte, with the appearance of sodium dendrites that form during charge/discharge, especially with a high current. The interaction between MHCF and sodium causes a difficult charge transfer through the interface between electrode and electrolyte, and even the collapse of the MHCF structure.

It would be advantageous if MHCM electrodes could be fabricated in a structure that minimized cathode degradation and the formation of metal dendrites, and promoted long cycling life, especially at high charge/discharge currents.

[1] V. D. Neff, "Some Performance Characteristics of a Prussian Blue Battery", *Journal of Electrochemical Society* 1985, 132, 1382-1384.

[2] N. Imanishi, T. Morikawa, J. Kondo, Y. Takeda, Q. Yamamoto, N. Kinugasa, and T. Yamagishi, "Lithium Intercalation Behavior into Iron Cyanide Complex as Positive Electrode of Lithium Secondary Battery", *Journal of Power Sources* 1999, 79, 215-219.

[3] Y. Lu, L. Wang, J. Cheng, and. J. B. Goodenough, "Prussian Blue: a New Framework for Sodium Batteries", *Chemistry Communications* 2012, 48, 6544-6546.

[4] L. Wang, Y. Lu, J. Liu, M. Xu, J. Cheng, D. Zhang, and. J. B. Goodenough, "A Superior Low-Cost Cathode for a Na-ion Battery", *Angewandte Chemie International Edition* 2013, 52, 1964-1967.

[5] A. Eftekhari, "Potassium Secondary Cell Based on Prussian Blue Cathode", *Journal of Power Sources* 2004, 126, 221-228.

[6] C. D. Wessells, R. A. Huggins, and Y. Cui, "Copper Hexacyanoferrate Battery Electrodes with Long Cycle Life and High Power", *Nature Communications* 2011, 2, Article number: 550.

[7] C. D. Wessells, S. V. Peddada, R. A. Huggins, and Y. Cui, "Nickel Hexacyanoferrate Nanoparticle Electrodes for Aqueous Sodium and Potassium Ion Batteries", *Nano Letters* 2011, 11, 5421-5425.

[8] C. D. Wessells, S. V. Peddada, M. T. McDowell, R. A. Huggins, and Y. Cui, "The Effect of Insertion Species on Nanostructured Open Framework Hexacyanoferrate Battery Electrodes", *Journal of the Electrochemical Society* 2012, 159, A98-A103.

[9] T. Matsuda, M. Takachi, and Y. Moritomo, "A Sodium Manganese Ferrocyanide Thin Film for Na-ion Batteries", *Chemical Communications* 2013, 49, 2750-2752.

[10] S-H. Yu, M. Shokouhimehr, T. Hyeon, and Y-E. Sung, "Iron Hexacyanoferrate Nanoparticles as Cathode Materials for Lithium and Sodium Rechargeable Batteries", *ECS Electrochemistry Letters* 2013, 2, A39-A41.

SUMMARY OF THE INVENTION

Disclosed herein is a novel structure for metal hexacyanometallate (MHCM) electrodes. When these electrodes are used in rechargeable batteries, they demonstrate high capacities and good cycling lives. The molecule of MHCM can be generally expressed as $(A)_xM1_yM2_z(CN)_n \cdot mH_2O$. "A" is an alkali or alkaline metal, and M1 and M2 are the same or different metal ions. For example, M1 and M2 may be: titanium (Ti), vanadium (V), chromium (Cr), manganese (Mn), iron (Fe), cobalt (Co), nickel (Ni), copper (Cu), zinc (Zn), Ca, magnesium (Mg), etc. In one aspect, the MHCM electrode includes multilayers. The electrode layers need not have the same composition, and at least one layer contains more than 50 percent by weight (wt %) non-active components. In another aspect, the MHCM electrode has a different composition distribution along the direction that faces the counter electrode (anode) in an assembled battery, although it need not have multilayers.

Accordingly, a method is presented for shielding a cathode in a metal cyanometallate battery. A battery is provided with an anode, a cathode, an electrolyte, and an ion-permeable membrane separating the anode from the cathode. The cathode is made up of a plurality of metal cyanometallate layers overlying the current collector. At least one of the metal cyanometallate layers is an active layer formed from an active material $A_xM1_yM2_z(CN)_N \cdot M_2O$;

where "A" is one of a first group of metals such as alkali metals, alkaline earth metals, or combinations thereof;
where M1 and M2 are transition metals;
where X is less than or equal to 6;
where Y is less than or equal to 4;
where Z is less than or equal to 4;
where N is less than or equal to 10; and,
where M is less than or equal to 20.

At least one of the metal cyanometallate layers is a shield layer comprising less than 50 percent by weight (wt %) active material. In response to applying an external voltage potential between the cathode and the anode, the method charges the battery. Upon discharge, the shield layer blocks metal particles from contacting active layers. Simultaneously, the shield layer transports metal ions from the electrolyte to the active layers.

Each shield layer is made from a shield material such as carbonaceous materials, polymers, inorganic compounds, conductive dielectrics, or non-conductive dielectrics. If a plurality of shield layers is used, each shield layer may have a corresponding independent definition of shield material. Likewise, each shield layer may have a corresponding independent percentage of active material. That is, the plurality of shield layers need not be made up of the same shield materials or the same weight percentage of active material.

In one aspect, each active layer is made up of more than 50 wt % active material. If a plurality of active layers are used, each active layer may include a corresponding independent percentage of active material, or corresponding independent definition of $A_xM1_yM2_z(CN)_N \cdot mH_2O$. That is, the plurality of active layers need not be made up of the same active materials or the same weight percentage of active material.

Additional details of the above-described method, a shielded metal cyanometallate electrode, and batteries with cathode shield layers are presented below.

BRIEF DESCRIPTION OF THE DRAWINGS

FIGS. 3A through 3D are partial cross-sectional views of a shielded metal cyanometallate electrode.

DETAILED DESCRIPTION

FIGS. 3A through 3D are partial cross-sectional views of a shielded metal cyanometallate electrode. The electrode 300 comprises an electrically conductive current collector 302 and a plurality of metal cyanometallate layers 304 overlying the current collector 302. The plurality of metal cyanometallate layers includes at least one active layer. Shown are active layers 306-0 through 306-n, where n is an integer greater than or equal to zero. In this example, n=2. The active layers 306-0 through 306 comprise an active material $A_xM1_yM2_z(CN)_N \cdot M_2O$;

where "A" is from a first group of metals;
where M1 and M2 are transition metals;
where X is less than or equal to 6;
where Y is less than or equal to 4;
where Z is less than or equal to 4;
where N is less than or equal to 10; and,
where M is less than or equal to 20.

The plurality of metal cyanometallate layers also includes at least one shield layer comprising less than 50 percent by weight (wt %) active material. Although not shown., a polymeric binder such as polytetrafluoroethylene (PTFE) or polyvinylidene difluoride (PVDF) may be used to provide adhesion between active and shield materials and the current collector to improve the overall physical stability.

Figure 1:
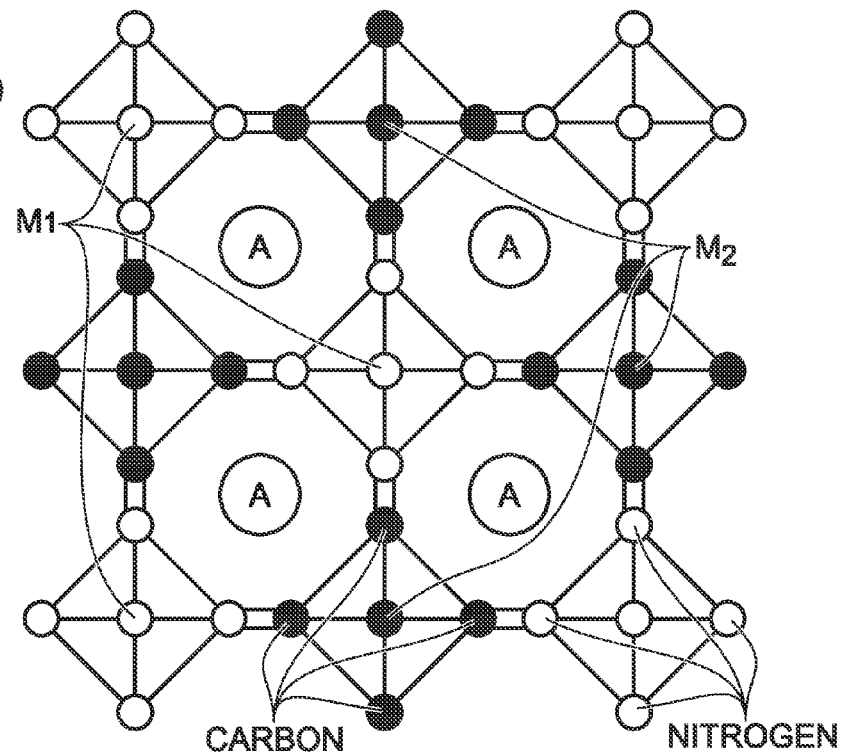
FIG. 1 is a diagram depicting the crystal structure of a metal hexacyanometallate (MHCM) (prior art).
Figure 2:
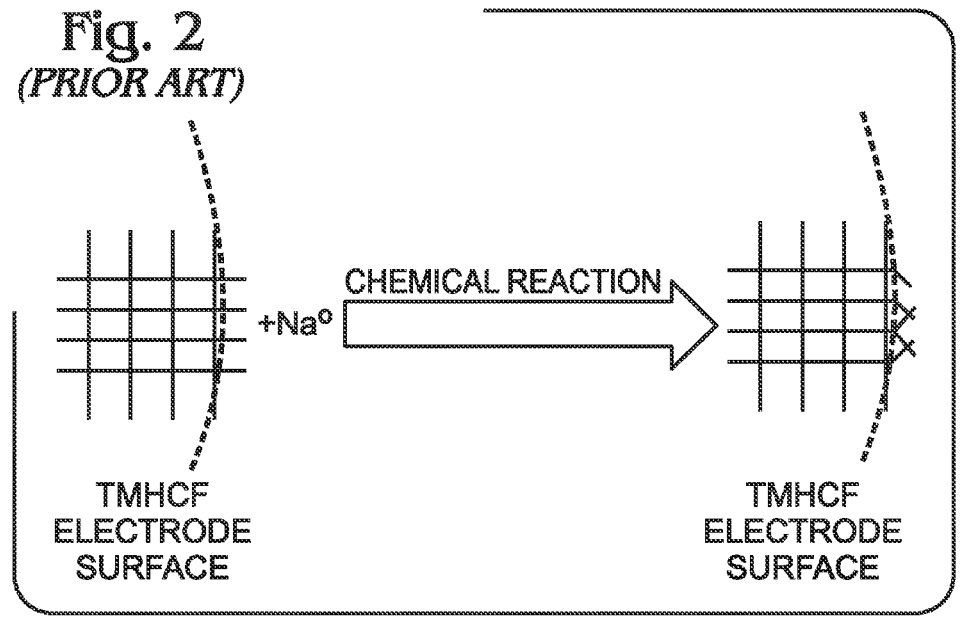
FIG. 2 is a diagram depicting metal-HCF (MHCF) electrode degradation as a result of sodium dendrites (prior art).
Figure 3C:
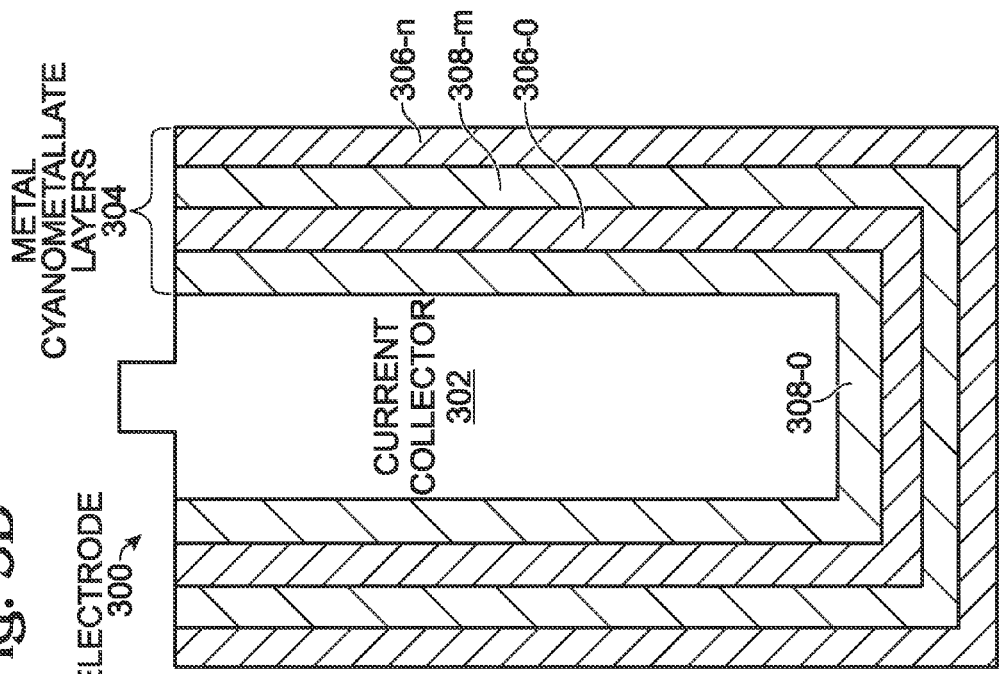
Figure 3D:
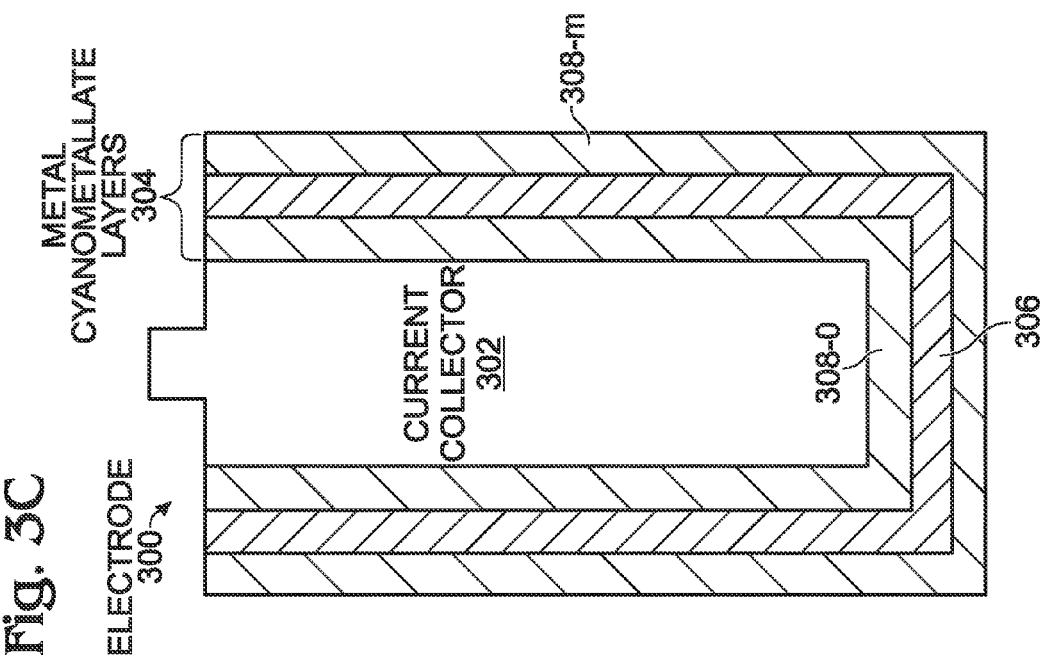

FIG. 3A depicts an example where a single shield layer 308 forms the exterior-most (furthest from the current collector 302) metal cyanometallate layer. FIG. 3B depicts an example where the shield layer 308 is interposed between active layer 306-0 and 306-n. However, it should be understood that the shield layer 308 is not limited to any particular position in the stack of metal cyanometallate layers. FIG. 3C depicts an example showing a single active layer 306 and a plurality of shield layers 308-0 through 308-m, where m is an integer greater than or equal to zero. In this example, m=2. FIG. 3D depicts an example showing an active layer 306-0 through 306-n and shield layers 308-0 through 308-m. Again in FIGS. 3C and 3D, the positions of the active and shield layers in the stack of metal cyanometallate layers are not limited to any particular arrangement. Note: the figures are not drawn to scale.

Typically, each active layer 306 comprises more than 50 wt % active material. In the case of a plurality of active layers, such as active layers 306-0 through 306-n in FIGS. 3A, 3B, and 3D, each active layer comprises a corresponding independent definition of $A_xM1_yM2_z(CN)_N \cdot mH_2O$. Likewise, each active layer comprises a corresponding independent percentage of active material. Alternatively stated, the active layers need not necessarily be made of the same active materials or the same weight percentage of active materials.

Typically, the first group of metals includes alkali metals, alkaline earth metals, and combinations thereof. Some explicit examples include lithium (Li), sodium (Na), potassium (K), rubidium (Rb), cesium (Cs), calcium (Ca), and magnesium (Mg). Transition metals M1 and M2 are each independently derived, meaning they need not necessarily be the same material. Some examples of transition metals include titanium (Ti), vanadium (V), chromium (Cr), manganese (Mn), iron (Fe), cobalt (Co), nickel (Ni), copper (Cu), zinc (Zn), Ca, and Mg.

Typically, the shield materials that comprise the shield layer 308 include carbonaceous materials, polymers, inorganic compounds, conductive dielectrics, and non-conductive dielectrics. In the case where a plurality of shield layers are used, such as in FIGS. 3C and 3D, each shield layer 308-0 through 308-m comprises a corresponding independent definition of shield material. Likewise, each shield layer 308-0 through 308-m comprises a corresponding independent percentage of active material. Alternatively stated, the shield layers 308-0 through 308-m need not necessarily be made of the same shield materials or the same weight percentage of active materials. Note: although not depicted, a multilayer metal cyanometallate electrode may be comprised of at least one layer comprising active and shield portions, as described in the explanation of FIG. 4.

Figure 4:
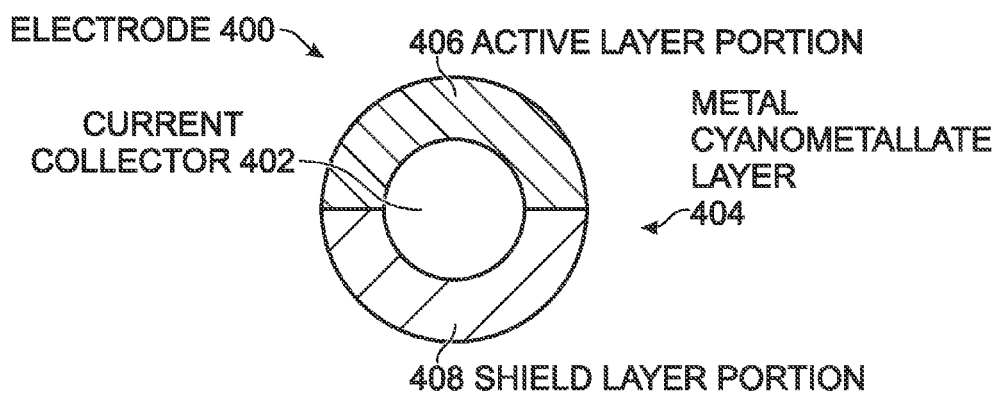
FIG. 4 is a plan view of a shielded metal cyanometallate electrode variation.

FIG. 4 is a plan view of a shielded metal cyanometallate electrode variation. In this aspect, the electrode 400 comprises an electrically conductive current collector 402 and a metal cyanometallate layer 404 overlying the current collector 402. The metal cyanometallate layer 404 includes an active layer portion 406 comprising an active material $A_xM1_yM2_z(CN)_N \cdot M_2O$;

where "A" is selected from a first group of metals;
where M1 and M2 are transition metals;
where X is less than or equal to 6;
where Y is less than or equal to 4;
where Z is less than or equal to 4;
where N is less than or equal to 10; and,
where M is less than or equal to 20.

The metal cyanometallate layer 404 also includes a shield layer portion 408 comprising less than 50 wt % active material. The definition of "A", M1, M2, and the list of possible shield materials are the same as presented above in the explanation of FIGS. 3A-3D, and are not repeated here in the interest of brevity. Note: although not depicted, the electrode of FIG. 4 may additionally include either metal cyanometallate active or shield layers, or both.

Figure 5:
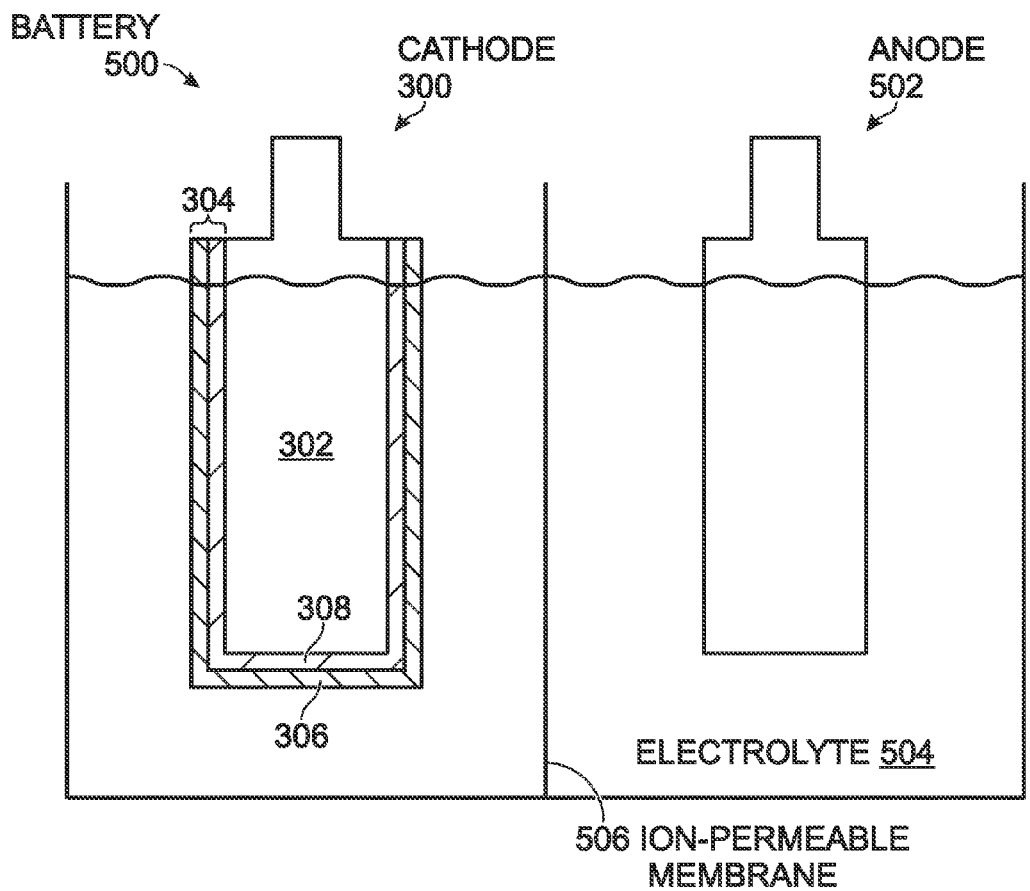
FIG. 5 is a partial cross-sectional view of a metal cyanometallate battery with a shielded electrode.

FIG. 5 is a partial cross-sectional view of a metal cyanometallate battery with a shielded electrode. The battery 500 comprises an anode 502, an electrolyte 504, and an ion-permeable membrane 506. Some example of anode materials include carbon (C), silicon (Si), antimony (Sb), lead (Pb), tin (Sn), and phosphorus (P).

The electrolyte 504 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene) oxide (PEO) and fluorinated polymers such as poly(vinylidene) fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. In some instances not shown, the ion-permeable membrane 506 and the electrolyte 504 can be the same material, as may be the case for polymer gel, polymer, and solid electrolytes.

The battery 500 further comprises a cathode (i.e. the electrode of FIGS. 3A-3D) 300, which in this aspect, includes a plurality of metal cyanometallate layers 304 such as described in the explanation of FIGS. 3A-3D. In this example, the metal cyanometallate layers 304 comprise a single active layer 306 and a single shield layer 308. Although the shield layer 308 is shown as the interior-most layer (closest to the current collector 302), in other aspects the active layer may be the interior-most layer. As explained above, the shield layer 308 comprises less than 50 percent by weight (wt %) active material.

Figure 6:
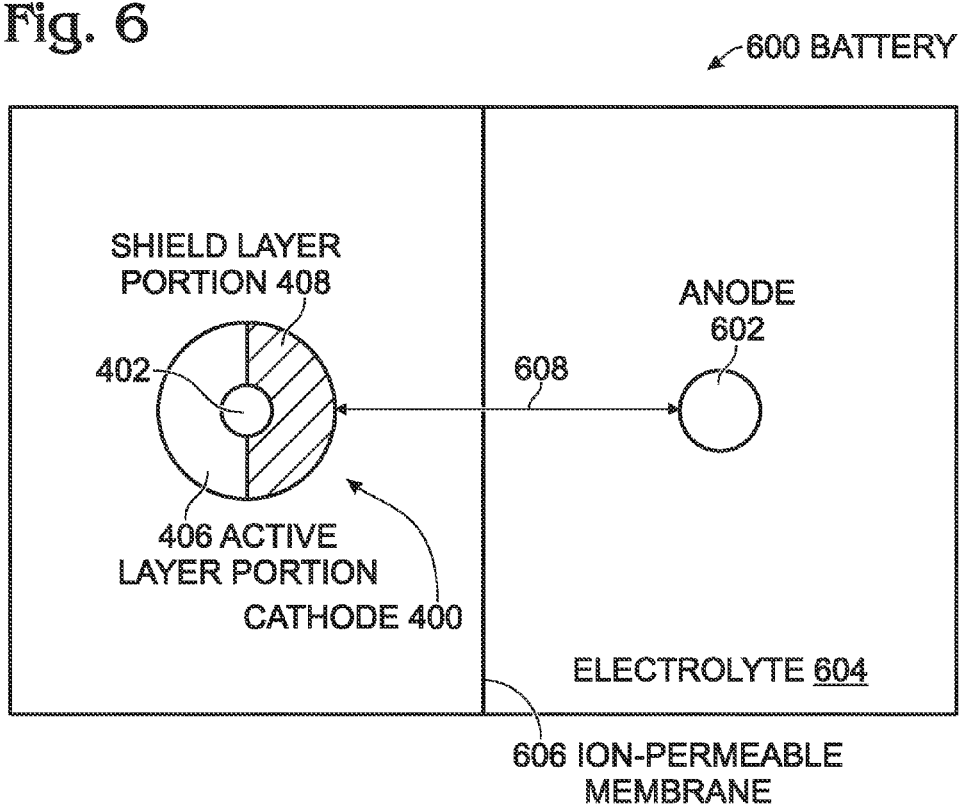
FIG. 6 is a plan view of a variation of the metal cyanometallate battery with a shielded electrode.

FIG. 6 is a plan view of a variation of the metal cyanometallate battery with a shielded electrode. In this aspect, the battery 600 comprises an anode 602, an electrolyte 604, and an ion-permeable membrane 606. The battery 600 further comprises a cathode (i.e. electrode 400 of FIG. 4) 400 as described above in the explanation of FIG. 4. The cathode 400 includes an active layer portion 406 comprising an active material $A_xM1_yM2_z(CN)_N \cdot M_2O$. The cathode 400 also includes a shield layer portion 408 comprising less than 50 wt % active material. The shield layer portion 408 has greater proximity (is closer in distance 608) to the anode 602 than the active layer portion 406.

In rechargeable metal-ion batteries with metal hexacyanometallate (MHCM) cathodes, metal ions travel back and forth between the anode and cathode during charge and discharge. Noteworthy is the fact that metal-ions conventionally electroplate on the surface of the anode due to high over-potentials at high charge/discharge currents. Simultaneously, the rough surface of the anode causes an uneven current distribution which form metal dendrites. For a simple demonstration of Na-dendrite formation, an electrochemical cell was constructed consisting of symmetric sodium-metal electrodes. In a glove box, the cell was charged and discharged every 10 minutes with a current of 5 milliamps (mA). With a 10-minute charge, the lustrous sodium electrode became dull, while solid particles were observed in the electrolyte. After 2 hours, the electrolyte became cloudy.

Dendrites may penetrate the separator (ion-permeable membrane) in a battery and cause an internal short circuit. This is one of the major failure mechanisms in Li-ion batteries. In additional to penetrating the separator and shorting the battery, the dendrites tend to fall off from the anode electrode surface and migrate to any part of battery, which causes capacity degradation if the metal ion source in the battery is limited. In the case of a Li-ion battery with an oxide cathode (e.g., $LiFePO_4$, $LiNiO_2$, $LiMn_2O_4$) and graphite anode, the amount of capacity degradation is proportional to the amount of Li-dendrite loss at anode. In the case of a metal-ion battery with a MHCM cathode, spontaneous reactions occur if dendrites migrate to cathode side through separator and make direct contact with the MHCM materials. This reaction degrades the battery capacity much more severely than just lost the amount of metal ions (as in the Li-ion battery case).

In an experiment showing the reaction of $Na_2MnFe(CN)_6$ with sodium in an organic electrolyte, the $Na_2MnFe(CN)_6$ electrode was immersed into a sodium particle-containing organic electrolyte. After one week, the cloudy sodium particle-containing electrolyte became transparent, meaning that a chemical reaction took place between the $Na_2MnFe(CN)_6$ electrode and sodium. In a sodium ion battery with a $Na_2MnFe(CN)_6$ electrode, once sodium dendrites form during charge/discharge, battery performance degrades dramatically.

Figure 7:
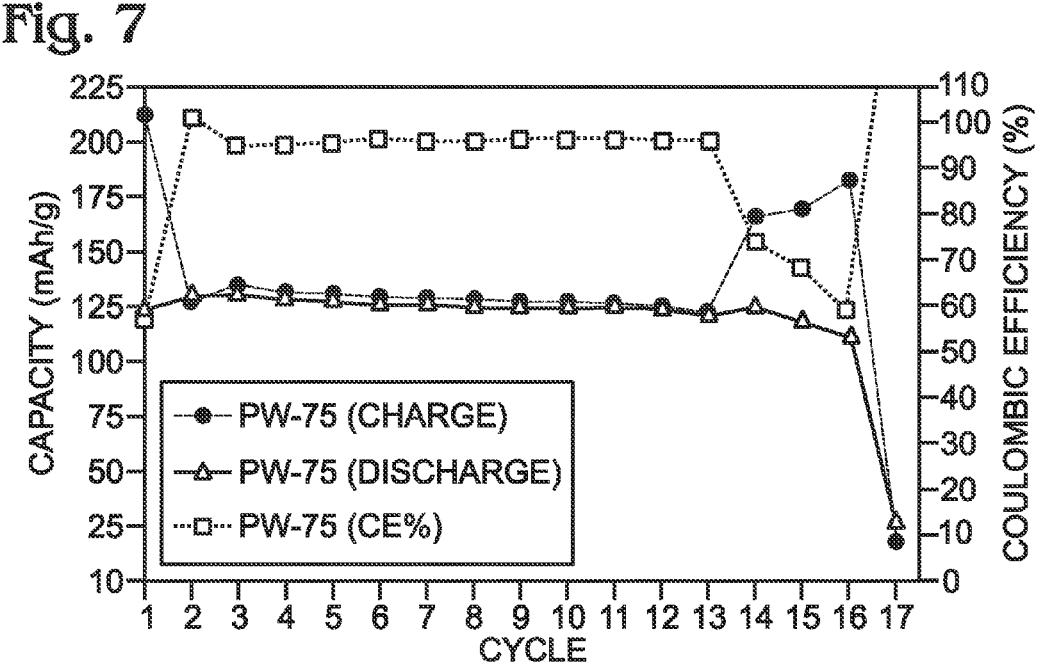
FIG. 7 is a graph depicting cycling capacity data for a $Na_2MnFe(CN)_6$ cathode.

FIG. 7 is a graph depicting cycling capacity data for a $Na_2MnFe(CN)_6$ cathode. Sodium metal was used in a battery with an electrolyte containing $NaClO_4$ salt in EC/DEC organic solvent. The battery shows relatively flat charge/discharge capacity up to the $13^{th}$ cycle. Starting from the $14^{th}$ cycle, the charge capacity is much higher than the discharge capacity. This capacity change is due to Na-dendrites penetrating the separator and making contact with the $Na_2MnFe(CN)_6$ cathode. The discharge capacity starts dropping at the $15^{th}$ cycle and severely degrades at the $17^{th}$ cycle. The capacity drop is mainly due to the severe damage to the $Na_2MnFe(CN)_6$ material caused by sodium dendrites. The battery was cycled at 170 milliamps per gram (mA/g) between 2.0 V and 4.2 V.

Figure 8:
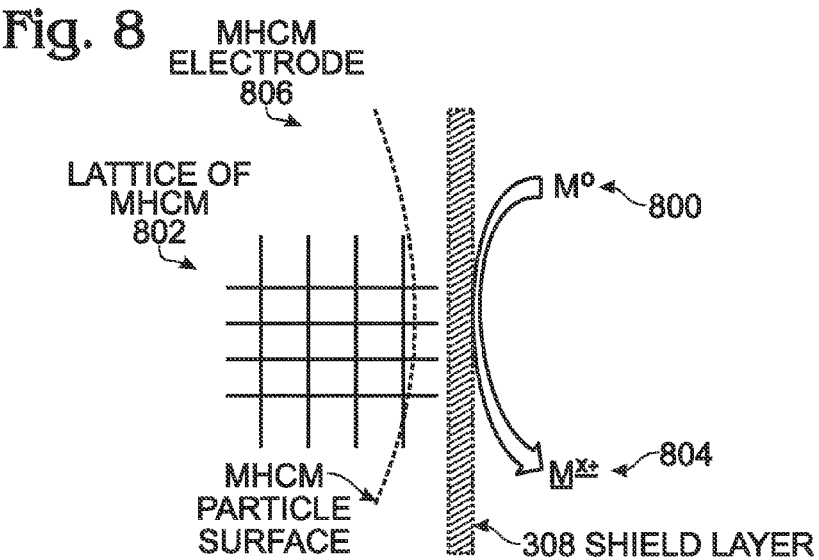
FIG. 8 is a diagram depicting the above-described shield layer as used in protecting a MHCM cathode in a sodium-ion battery.

FIG. 8 is a diagram depicting the above-described shield layer as used in protecting a MHCM cathode in a sodium-ion battery. The shield layer 308 has a porous structure and is made of either electronically conducting materials or insulating materials, for example, carbonaceous materials, polymers, inorganic compounds, or dielectric particles such as silicon dioxide ($SiO_2$), aluminum oxide ($Al_2O_3$), and titanium oxide ($TiO_2$). The porous structure of the shield layer 308 allows the metal ions 800 to transport to the MHCM lattice 802, but blocks or absorbs metal particles 804. If the shield layer 308 is electronically conductive and the MHCM electrode 806 works at a high potential, the metal particles 804 on or around the shield layer 308 are oxidized to metal-ions that are lost in transport to the MHCM materials. With the shield layer 308, the cycling life of MHCM electrodes can be improved remarkably. Multiple protection layers can also be formed on the MHCM electrodes. The outmost layer does not include any, or only low concentrations of MHCM (active) materials.

Figure 9A:
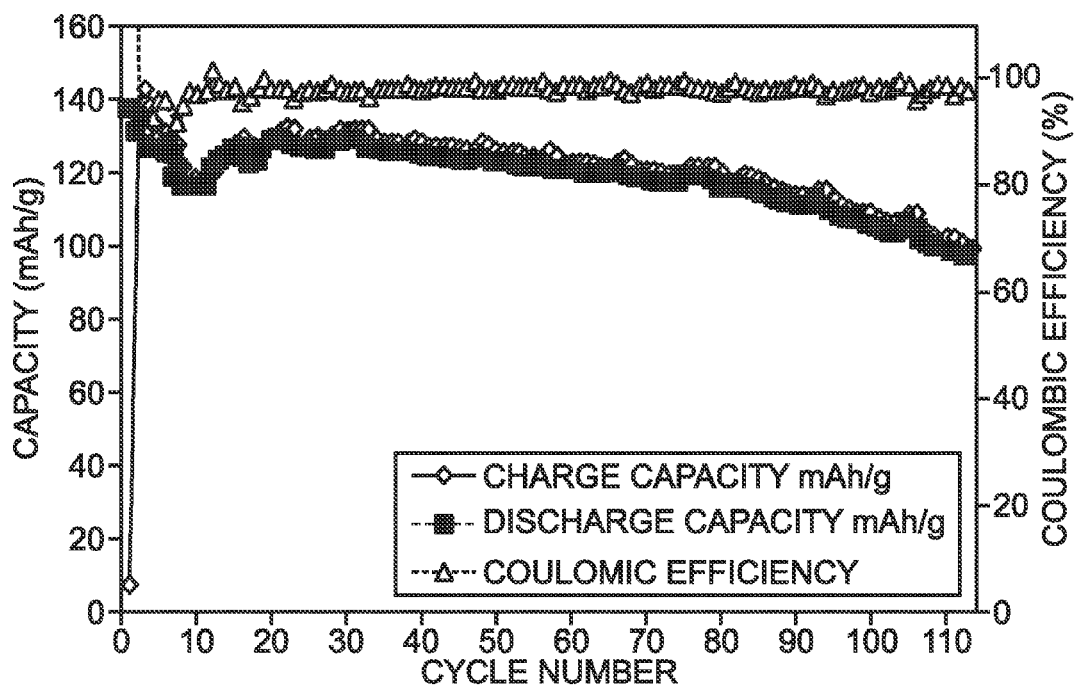
FIGS. 9A and 9B are graphs comparing the cycling behavior of $FeFe(CN)_6$ (Berlin Green, BG) cathodes, with and without a carbon black film shield layer.
Figure 9B:
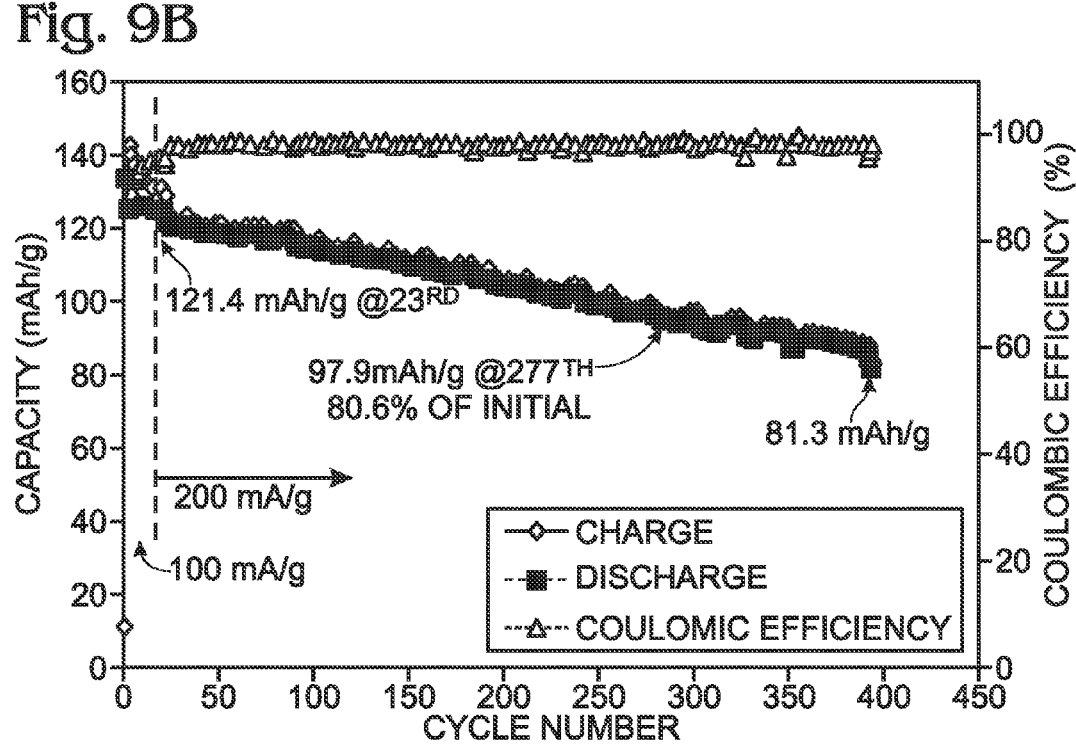

FIGS. 9A and 9B are graphs comparing the cycling behavior of $FeFe(CN)_6$ (Berlin Green, BG) cathodes, with and without a carbon black film shield layer. The carbon black film was made of acetylene black and a binder of polytetrafluoroethylene (PTFE). Without the carbon black protection (FIG. 9A), the BG electrode retained 80% capacity after 104 cycles with a charge/discharge current of 100 mA/g. It is believed that sodium dendrites were the main cause of degradation. After being coated with the carbon black layer (FIG. 9B), the BG electrode retained 80% capacity after 250 cycles, even though a higher current of 200 mA/g was used that would conventionally cause a greater production of sodium dendrites in the battery. The carbon film played two roles in lengthening the cycling of BG electrode. One is that the film prevented the BG electrode from contact with the sodium dendrite. The other is that sodium dendrites were oxidized when contacting the carbon film because of its high oxidization potential. Therefore, it is concluded that the shield layers effectively improve the performance of MHCM electrodes.

Figure 10:
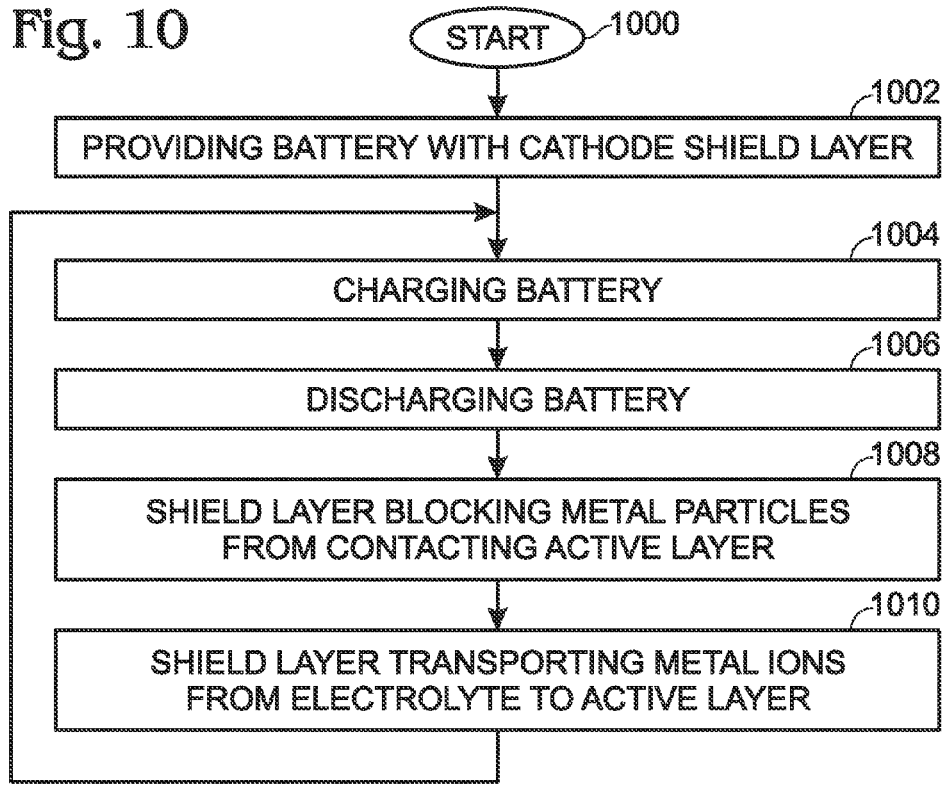
FIG. 10 is a flowchart illustrating a method for shielding a cathode in a metal cyanometallate battery.

FIG. 10 is a flowchart illustrating a method for shielding a cathode in a metal cyanometallate battery. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 provides a battery with an anode, a cathode, an electrolyte, and an ion-permeable membrane separating the anode from the cathode, see FIG. 5. The battery cathode comprises a plurality of metal cyanometallate layers overlying the current collector, as follows:

at least one active layer comprising an active material $A_xM1_yM2_z(CN)_N \cdot M_2O$;
where "A" is selected from a first group of metals;
where M1 and M2 are transition metals;
where X is less than or equal to 6;
where Y is less than or equal to 4;
where Z is less than or equal to 4;
where N is less than or equal to 10; and,
where M is less than or equal to 20.

Further, the plurality of metal cyanometallate layers provided in Step 1002 includes at least one shield layer comprising less than 50 percent by weight (wt %) active material. Alternatively, the battery of FIG. 6 is provided in Step 1002 with a metal cyanometallate layer comprising an active material portion and shield layer portion most proximate to the anode.

In response to applying an external voltage potential between the cathode and the anode (i.e., connecting the cathode and anode to a current source, sourcing current to the cathode), Step 1004 charges the battery. During charging, metal ions are removed from the cathode and migrate to the anode via the electrolyte. In some aspects, the charging of the battery causes metal dendrites to form on the anode, or cause metal particles to precipitate into the electrolyte. Step 1006 discharges the battery (i.e., connecting the cathode to the anode through a load). In Step 1008 the shield layer blocks metal particles from contacting active layers. In Step 1010 the shield layer transports metal ions from the electrolyte to the active layers. In one aspect, Steps 1008 and 1010 are performed simultaneously. The cycle can be repeated by returning the Step 1004.

In one aspect, Step 1002 provides a battery where each active layer comprises more than 50 wt % active material. If Step 1002 provides a plurality of active layers, each active layer comprises a corresponding independent percentage of active material. Likewise, each active layer comprises a corresponding independent definition of $A_xM1_yM2_z(CN)_N \cdot mH_2O$. That is, each active layer need not include the same active materials or the same wt % of active materials.

In another aspect, Step 1002 provides a battery where the active material first group of metals includes alkali metals, alkaline earth metals, and combinations thereof. Some explicit examples of first group metals include lithium (Li), sodium (Na), potassium (K), rubidium (Rb), cesium (Cs), calcium (Ca), and magnesium (Mg). Step 1002 also provides a battery where M1 and M2 are each independently derived (need not be the same), from a metal such as titanium (Ti), vanadium (V), chromium (Cr), manganese (Mn), iron (Fe), cobalt (Co), nickel (Ni), copper (Cu), zinc (Zn), Ca, and Mg.

In another aspect, Step 1002 provides a battery where each shield layer comprises a shield material such as carbonaceous materials, polymers, inorganic compounds, conductive dielectrics, and non-conductive dielectrics. If Step 1002 provides a plurality of shield layers, each shield layer comprises a corresponding independent definition of shield material. Likewise, each shield layer comprises a corresponding independent percentage of active material. That is, each shield layer need not include the same shield materials or the same wt % of active materials.

A metal cyanometallate battery shielding mechanism has been provided. Examples of particular materials and process steps have been presented to illustrate the invention. However, the invention is not limited to merely these examples. Other variations and embodiments of the invention will occur to those skilled in the art.

We claim:

1. A shielded metal cyanometallate electrode comprising:
an electrically conductive current collector;
a plurality of metal cyanometallate layers overlying the current collector, as follows:
at least one active layer comprising more than 50 wt % of an active material $A_XM1_YM2_Z(CN)_N \cdot mH_2O$;
where "A" is selected from a first group of metals;
where M1 and M2 are transition metals;
where X is less than or equal to 6;
where Y is less than or equal to 4;
where Z is less than or equal to 4;
where N is less than or equal to 10;
where M is less than or equal to 20; and,
at least one shield layer, comprising less than 50 percent by weight (wt %) active material, adjacent to active layer.

2. The shielded electrode of claim 1 wherein each shield layer comprises a shield material selected from a group consisting of carbonaceous materials, polymers, inorganic compounds, conductive dielectrics, and non-conductive dielectrics.

3. The shielded electrode of claim 1 wherein the metal cyanometallate layers include a plurality of shield layers, each shield layer comprising a corresponding independent definition of shield material.

4. The shielded electrode of claim 1 wherein the metal cyanometallate layers include a plurality of active layers, each active layer comprising a corresponding independent percentage of active material.

5. The shielded electrode of claim 1 wherein the metal cyanometallate layers include a plurality of shield layers, each shield layer comprising a corresponding independent percentage of active material.

6. The shielded electrode of claim 1 wherein the metal cyanometallate layers include a plurality of active layers, each active layer comprising a corresponding independent definition of $A_XM1_YM2_Z(CN)_N \cdot mH_2O$.

7. The shielded electrode of claim 1 wherein the first group of metals is selected from a group consisting of alkali metals, alkaline earth metals, and combinations thereof.

8. The shielded electrode of claim 7 wherein the first group of metals is selected from a group of metals consisting of lithium (Li), sodium (Na), potassium (K), rubidium (Rb), cesium (Cs), calcium (Ca), and magnesium (Mg).

9. The shielded electrode of claim 1 wherein M1 and M2 are each independently derived, as selected from a group consisting of titanium (Ti), vanadium. (V), chromium (Cr), manganese (Mn), iron (Fe), cobalt (Co), nickel (Ni), copper (Cu), zinc (Zn).

10. A shielded metal cyanometallate electrode comprising:
    an electrically conductive current collector;
    a metal cyanometallate layer overlying the current collector, as follows:
        an active layer portion comprising more than 50 wt % of an active material $A_X M1_Y M2_Z(CN)_N \cdot mH_2O$;
        where "A" is selected from a first group of metals;
        where M1 and M2 are transition metals;
        where X is less than or equal to 6;
        where Y is less than or equal to 4;
        where Z is less than or equal to 4;
        where N is less than or equal to 10;
        where M is less than or equal to 20; and,
        a shield layer portion comprising less than 50 percent by weight (wt %) active material.

11. A method for shielding a cathode in a metal cyanometallate battery, the method comprising;
    providing a battery with an anode, a cathode, an electrolyte, and an ion-permeable membrane separating the anode from the cathode, where the cathode comprises a plurality of metal cyanometallate layers overlying the current collector, as follows:
        at least one active layer comprising more than 50 wt % of an active material $A_X M1_Y M2_Z(CN)_N \cdot mH_2O$;
        where "A" is selected from a first group of metals;
        where M1 and M2 are transition metals;
        where X is less than or equal to 6;
        where Y is less than or equal to 4;
        where Z is less than or equal to 4;
        where N is less than or equal to 10;
        where M is less than or equal to 20;
        at least one shield layer comprising less than 50 percent by weight (wt %) active material;
    in response to applying an external voltage potential between the cathode and the anode, charging the battery;
    in response to creating an external load between the cathode and anode, discharging the battery;
    the shield layer blocking metal particles from contacting active layers; and,
    the shield layer transporting metal ions from the electrolyte to the active layers.

12. The method of claim 11 wherein providing the battery includes each shield layer comprising a shield material selected from a group consisting of carbonaceous materials, polymers, inorganic compounds, conductive dielectrics, and non-conductive dielectrics.

13. The method of claim 12 wherein providing the battery includes providing a plurality of shield layers, each shield layer comprising a corresponding independent definition of shield material.

14. The method of claim 11 wherein providing the battery includes providing a plurality of active layers, each active layer comprising a corresponding independent percentage of active material.

15. The method of claim 11 wherein providing the battery includes providing a plurality of shield layers, each shield layer comprising a corresponding independent percentage of active material.

16. The method of claim 11 wherein providing the battery includes providing a plurality of active layers, each active layer comprising a corresponding independent definition of $A_X M1_Y M2_X(CN)_N \cdot mH_2O$.

17. The method of claim 11 wherein providing the battery includes the first group of metals being selected from a group consisting of alkali metals, alkaline earth metals, and combinations thereof.

18. The method of claim 17 wherein providing the battery includes the first group of metals being selected from a group of metals consisting of lithium (Li), sodium (Na), potassium (K), rubidium (Rb), cesium (Cs), calcium (Ca), and magnesium (Mg).

19. The method of claim 11 wherein providing the battery includes M1 and M2 each being independently derived from a group consisting of titanium (Ti), vanadium (V), chromium. (Cr), manganese (Mn), iron (Fe), cobalt (Co), nickel (Ni), copper (Cu), zinc (Zn).

20. A metal cyanometallate battery with a shielded electrode, the battery comprising:
    an anode;
    an electrolyte;
    an ion-permeable membrane;
    a cathode comprising a plurality of metal cyanometallate layers, as follows:
        at least one active layer comprising more than 50 wt % of an active material $A_X M1_Y M2_Z(CN)_N \cdot mH_2O$;
        where "A" is selected from. a first group of metals;
        where M1 and M2 are transition metals;
        where X is less than or equal to 6;
        where Y is less than or equal to 4;
        where Z is less than or equal to 4;
        where N is less than or equal to 10;
        where M is less than or equal to 20; and,
        at least one shield layer, comprising less than 50 percent by weight (wt %) active material, adjacent to the active layer.

21. A metal cyanometallate battery with a shielded electrode, the battery comprising:
    an anode;
    an electrolyte;
    an ion-permeable membrane;
    a cathode comprising:
        an active layer portion comprising more than 50 wt % of an active material $A_X M1_Y M2_Z(CN)_N \cdot mH_2O$;
        where "A" is selected from a first group of metals;
        where M1 and M2 are transition metals;
        where X is less than or equal to 6;
        where Y is less than or equal to 4;
        where Z is less than or equal to 4;
        where N is less than or equal to 10;
        where M is less than or equal to 20;
        a shield layer portion comprising less than 50 percent by weight (wt %) active material; and.,
    wherein, the shield layer portion has greater proximity to the anode than the active layer portion.

* * * * *